Nov. 17, 1970   P. G. BERCIK ET AL   3,541,181
MULTISTAGE ISOMERIZATION PROCESS WITH INTER-STAGE COOLING
Filed Dec. 27, 1967
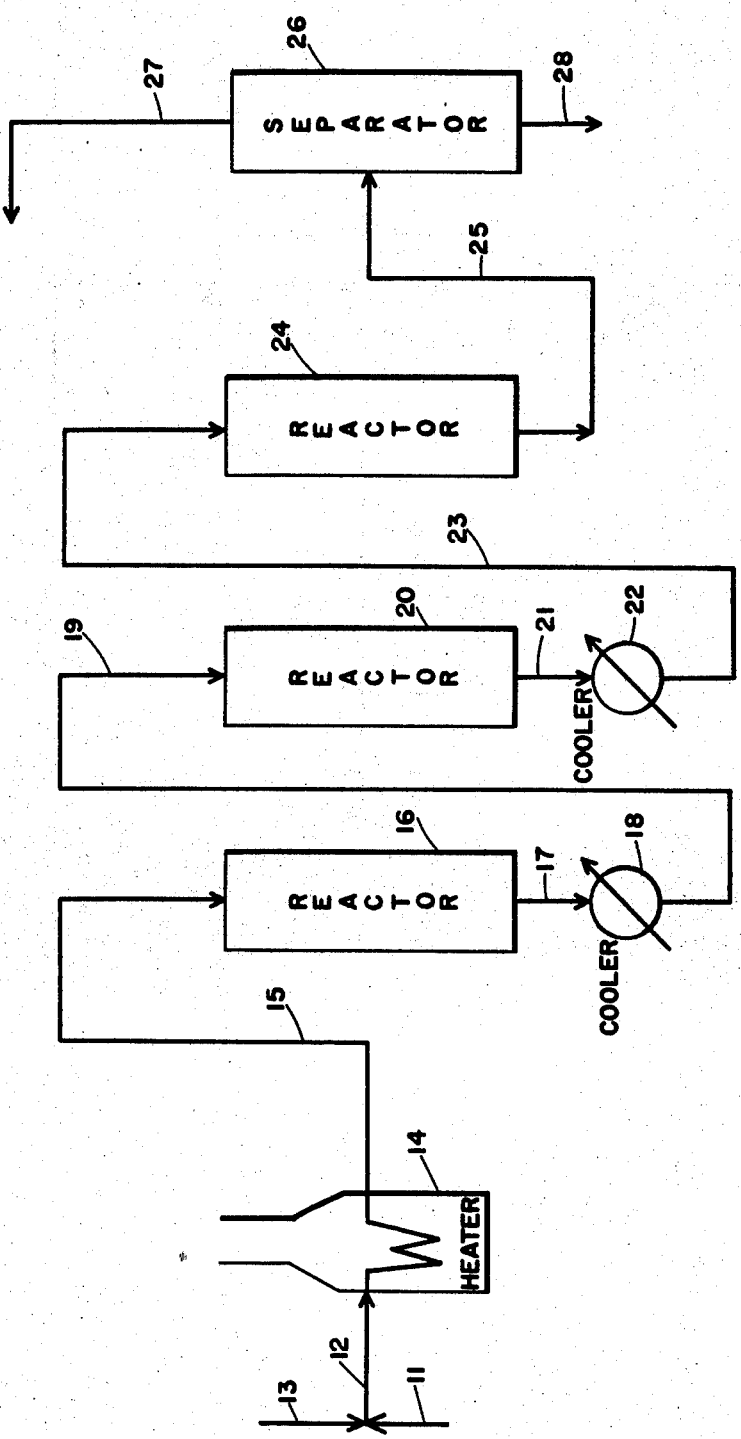
INVENTORS
PAUL G. BERCIK
ALFRED M. HENKE United States Patent Office 3,541,181
Patented Nov. 17, 1970

3,541,181
MULTISTAGE ISOMERIZATION PROCESS WITH INTER-STAGE COOLING
Paul G. Bercik, Beaumont, Tex., and Alfred M. Henke, Springdale, Pa., assignors to Gulf Research & Development Company, Pittsburgh, Pa., a corporation of Delaware
Filed Dec. 27, 1967, Ser. No. 693,849
Int. Cl. C07c 5/30
U.S. Cl. 260—683.67                                  10 Claims

ABSTRACT OF THE DISCLOSURE

Inter-stage cooling of the reactor effluent in a multistage isomerization process employing adiabatic reaction zones suppresses hydrocracking of the isomeric product and increases the ultimate isomer yield.

This invention relates to the isomerization of relatively unbranched hydrocarbons to more highly branched forms. More particularly, this invention relates to an improved catalytic isomerization process whereby the catalyst is used more efficiently.

It has been proposed to isomerize hydrocarbons, such as normal butane, normal pentane, etc. in the presence of catalysts such as those comprising alumina and a metalliferous hydrogenation component. These catalysts may be activated by treatment with such materials as a sulfur chloride, a carbon chloride and the like.

Conventionally, the isomerization catalyst has been provided in a single-bed reactor through which the hydrocarbon to be isomerized is passed. Equilibrium considerations of the isomerization process indicate that isomerization of low molecular weight normal paraffins, such as normal butane, is favored at relatively lower temperatures. However, the isomerization of materials such as normal butane is highly exothermic and an undesirable temperature rise takes place in the single bed of catalyst, e.g. from about 50° to about 100° F.

In a single-bed reactor, the temperature is highest near the end portion of the catalyst bed where the unconverted normal paraffin becomes diluted with the isoparaffinic product. The combination of high temperature and product dilution makes the isomerization of the unreacted normal paraffin more difficult.

Additionally, hydrocracking of the isomerized product increases at higher temperatures thereby decreasing the ultimate yield of the isomer. It has been proposed to employ an isothermal operation whereby the exothermic heat of reaction is removed by reactor cooling or refrigeration means. However, isothermal systems require a costly and elaborate reactor design to provide for the heat exchange means necessary for the removal of the exothermic heat of reaction.

It has now been found that increased conversion may be obtained and the detrimental effects of the temperature rise across the catalyst bed caused by the exothermic heat of reaction may be diminished by the process of the present invention whereby isomerizable hydrocarbons are contacted in a plurality of substantially adiabatic reaction zones, wherein the reaction in the first reaction zone is conducted for a shorter period of time as compared with the reaction time in subsequent reaction zones, and the temperature of the reaction effluent of each reaction zone is reduced prior to its entry into a subsequent reaction zone.

Surprisingly, it has been found that by: (1) employing two or more isomerization zones, each of which contain a portion of the total isomerization catalyst, rather than a single reaction zone; and (2) reducing the temperature of the reaction effluent before it is introduced into the next reactor, it is possible to control more closely the average temperature of the adiabatic reaction zones, reduce the likelihood of hydrocracking of the isomeric product and increase the ultimate yield of the isomeric hydrocarbon product. Furthermore, the utilization of a shorter reaction time in the first adiabatic reaction zone prevents the exothermic heat of reaction temperature in that zone from rising to an undesirably high level beyond the point at which the formation of the isomeric product is favored.

According to one embodiment of the present invention, the degree of cooling of the effluent streams between reaction zones is regulated so that the reactor outlet temperatures are substantially equal.

According to another embodiment of the invention, the degree of cooling of the effluent streams between reaction zones is controlled so that descending reactor outlet temperatures are obtained. It is especially preferred to employ this descending outlet temperature aspect of the invention. Hydrocracking reactions are less likely to occur while the conversion of the isomerizable hydrocarbon to the isomerized product continues at a reasonable rate. Since the concentration of the isomerizable hydrocarbon is the greatest in the first reaction zone, the conversion will continue at a reasonable rate and hydrocracking reactions will not usually occur. In the subsequent reaction zones, where the isomerizable hydrocarbon becomes diluted with th isomerized product, it is highly desirable to effect conversion of the isomerizable hydrocarbon at lower temperatures which favor isomerization of the isomerizable hydrocarbon, while the hydrocracking of the isomerized product is minimized.

The nature and objectives of the invention will be more readily understood by reference to the accompanying drawing.

Referring to the drawing, a feedstock containing isomerizable hydrocarbons is introduced by means of the line 11 into the line 12 where it becomes mixed with a hydrogen-containing gas stream which is introduced by means of the line 13.

The isomerizable hydrocarbons that may be isomerized according to the present process include straight-chain and slightly branched paraffins such as n-butane, n-pentane, n-hexane, and the like. Also, cycloparaffins, such as cyclohexane and its alkyl-substituted derivatives as well as the alkyl-substituted derivatives of cyclopentane may be isomerized by the present process. These materials may be derived from natural sources and may be obtained from the fractional distillation of gasoline and naphtha cuts obtained from crude oils or reforming, for example. However, the processes of the present invention is especially advantageous for the isomerization of low molecular weight normal paraffins, such as normal butane, which have a high exothermic heat of reaction and cause a high temperature rise in the adiabatic catalyst beds.

A hydrogen to hydrocarbon molar ratio of between about 0.01 and about 10 to 1, preferably between about 0.05 and about 4 to 1 is utilized. The desired hydrogen to hydrocarbon mol ratio is advantageously maintained by recycling hydrogen-containing gases that are separated from isomerized product stream. The isomerizable hydrocarbon-hydrogen mixture is introduced into the heater 14 by means of the line 12 wherein the temperature of the stream is suitably raised to between about 100° and about 500° F., preferably between about 250° and about 450° F.

The heated admixture is passed by means of the line 15 to the adiabatic reaction zones wherein the pressure is maintained in the range of between about atmospheric pressure and about 2000 p.s.i.g., preferably between about 300 and about 1000 p.s.i.g. A liquid hourly space velocity of between about 0.05 and about 10, preferably between about 0.5 and about 4 is employed.

The reactor 16 is provided with isomerization catalyst, such as an activated catalyst that may comprise a porous support. For example, excellent results are obtainable with porous aluminas prepared by calcining a beta-alumina trihydrate such as bayerite or mixtures thereof with other alumina hydrates. Aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha- and beta-alumina monohydrate such as boehmite and diaspore, or various combinations of any of these may be employed. Additionally, there may be used the aluminas described in U.S. Pats. 3,151,939; 3,151,940; and 3,188,174 of William L. Kehl and Meredith M. Stewart, which aluminas are prepared by calcining an alumina hydrate containing 1.2 to 2.6 mols of water of hydration per mol of alumina. The alumina bases may be essentially pure alumina as is preferred, or they may contain small amounts, up to about 45 percent of other refractory oxides, such as silica, beryllia, titania, zirconia, or boria. Such aluminas are generally characterized by a high surface areas, commonly ranging from about 200 to about 500 m.$^2$/g., or even more.

Especially advantageous results are obtainable when using aluminas having a surface area above about 250 m.$^2$/g., and more particularly, above about 300 m.$^2$/g., although aluminas of lower surface area may be used.

The catalyst bases from which the activated catalysts are prepared may be composited with a small proportion of at least one metalliferous component having hydrogenating activity and selected from the left-hand column of Group VI or from Group VIII of Mendeleev's Periodic Table. Examples of suitable materials are platinum, rhodium, palladium, nickel and tungsten. Especially good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 and 0.7 percent platinum or 1 percent palladium on alumina.

The hydrogenating component may be composited with the alumina in any convenient way. Thus, the hydrogenating component can be deposited on a precalcined alumina support in the form of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component may be added as a salt to the alumina hydrate and then precipitated with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

The activity of such catalysts may be further enhanced by treatment with hydrogen chloride and then a sulfur chloride such as in the manner disclosed in U.S. Pat. 3,322,689 of Giannetti et al., the disclosure of which is hereby incorporated by reference. Thus, the composite catalyst may be treated with hydrogen chloride and subsequently treated with a sulfur chloride, such as thionyl chloride or sulfur monochloride. Another suitable method for activating such catalysts is disclosed in U.S. patent application Ser. No. 588,744, filed on Oct. 24, 1966, now U.S. Pat. No. 3,441,514, the disclosure of which is also incorporated by reference. According to the activation method of that application, such composite catalysts may be activated by treatment with a sulfur chloride and oxygen-containing gas at a critical temperature of between about 750° and about 1100° F. to obtain a high degree of activation. Additional methods for preparing catalysts suitable for use in the present isomerization process are disclosed in U.S. patent application No. 561,710, filed on June 30, 1966, now U.S. Pat. 3,419,503, and application Ser. No. 604,180, filed on Dec. 23, 1966.

Regardless of the method of compositing the starting catalyst base, the noble metal hydrogenating components are advantageously converted to a reduced form prior to the pretreatment with hydrogen chloride or the activation treatment with a sulfur chloride. In the case of base metals such as nickel and tungsten, the hydrogenating component can remain in the form of a sulfide or oxide prior to any further activation, such as a hydrogen chloride pretreatment and a sulfur chloride activation treatment.

It is also important that the hydrogenating component be composited with the alumina base before hydrogen chloride pretreatment or sulfur chloride activation treatment, as deposition thereafter normally will result in a reduction of the chlorine content of the sulfur chloride treated base. This is undesirable, as the activity of the catalyst appears to be generally related to the increase in chlorine content attributable to sulfur chloride activation treatment.

The catalyst base may contain halogen other than that incorporated by a sulfur chloride treatment. For example, some halogen content may result from the use of an aluminum halide as a starting material to form the alumina base or alternatively, some halogen may remain in the catalyst owing to the use of a halogen-noble metal acid.

Referring again to the drawing, the reactor 16 may be suitably provided with an isomerization catalyst in the amount of between about 5 and about 50 to 60 percent of the total catalyst inventory of the system. However, it is preferred to utilize no more than a minor portion, i.e. between about 12 and about 35 percent by weight of the catalyst in the first reactor 16. Certain impurities, such as oxygenated compounds, that are present in the isomerization feeds cause deactivation of the isomerization catalyst in the direction of flow of the feedstock through the reaction zone. Thus, the first reaction zone 16 may be utilized as a catalytic guard reactor for protection of the subsequent catalyst beds. When the first reactor becomes deactivated, the catalyst therein may be either regenerated or replaced while the remaining catalyst beds continue in operation. Accordingly, if only a minor portion of the total catalyst is provided in the first reactor, the major portion of the catalyst can be continuously employed without substantially disrupting the system with only the minor portion being replaced. If a two-reactor system is employed, it is preferred to utilize between about 12 and about 40 percent of the total catalyst in the first reactor.

The reaction effluent from the reactor 16 is discharged therefrom by means of the line 17 and is passed through the cooler 18 wherein the temperature is reduced to the extent necessary to control the average reactor temperature level. For example, the temperature may be reduced between about 10° and about 30° F. The cooler 18 may be any suitable type of heat exchange means, such as air-cooled heat exchangers, liquid collant type heat exchangers, e.g. shell-and-tube type heat exchangers, etc.

The cooled effluent stream is passed by means of the line 19 to the reactor 20 which may be suitably provided with between about 5 and about 50 to 60 percent, preferably between about 12 and about 35 percent of the total catalyst inventory of the system. In the event that it is desired to employ a two-stage reactor system, reactor 20 would constitute the final reaction zone and would suitably contain between about 50 and about 95 percent, preferably between about 60 and about 88 percent of the total catalyst.

The outlet temperature of the reactor 20 is controlled by means of inter-stage cooling to a temperature between about 25° above and about 50° F. below the outlet temperature of reactor 16. Preferably, the outlet temperature of reactor 20 is between about 10° and about 30° F. below the outlet temperature of the reactor 16. As previously discussed, the reactor outlet temperatures may be regulated to be about the same temperature but it is preferable to provide descending reactor outlet temperatures in order to favor production of the isomeric product and inhibit the hydrocracking of the isomerized hydrocarbon which is present in increasing concentrations in the second and subsequent reactors.

The effluent from the reactor 20 is discharged therefrom by means of the line 21 and passed through the cooler 22 where the temperature of the effluent stream is reduced by the desired amount. Next, the cooled effluent is passed by means of the line 23 to the reactor 24 which is provided with between about 25 and about 90 percent, preferably between about 35 and about 76 percent of the total catalyst of the multi-bed reaction system.

The outlet temperature of the reactor 24 is suitably between about 25° above and about 50° F. below the outlet temperature of the reactor 16. Preferably, the reactor 24 outlet temperature is between about 10° and about 30° F. below the reactor 16 outlet temperature.

The effluent from the final reactor 24 is passed by means of the line 25 to a high pressure separator 26 from which a hydrogen-containing gaseous stream is removed by means of the line 27 and is recycled (by means not shown) to the line 11 for further employment in the isomerization process. A liquid product stream is discharged from the separator 26 by means of a line 28 and is conducted to suitable separation means (not shown) for recovery of the isomerized hydrocarbon product and any unconverted isomerizable hydrocarbon, which may be recycled to the reaction zones for further conversion.

As indicated previously, the residence time or contact time in the first reaction zone of our invention must be no greater than the subsequent residence time. Thus, for example, in a two reaction zone system the residence time in the first and second reaction zones can be equal, although we prefer that the residence time in the second reaction zone be greater than the residence time in the first reaction zone. Accordingly, the ratio of residence times in the first and second reaction zones can vary from 1:1 up to about 1:20 and preferably is in the range from about 1:1.5 up to about 1:7 or 8.

When employing three or more reaction zones in the system of our invention, the residence times in reactors can encompass a wide variety of relationships to each other and still remain within the basic requirement that the residence time in the first reaction zone be no greater than subsequent residence time. Thus, in a three reaction zone system relative residence times, such as, for example, 1:1:0.5 could be acceptable depending upon inlet and outlet temperatures for the three zones. Generally, however, we prefer that the residence time in each reaction zone of our process be no greater than the residence time employed in the immediately subsequent reaction zone. Accordingly, in a three reaction zone system we prefer to employ relative residence times in the range of 1:1 to 10:5 to 18. Advantageously, the relative residence times in the three reaction zones are in the range of 1:1 to 3:3 to 6 or 7.

Although not illustrated in the drawing, it is highly desirable to pretreat the feed to the isomerization reactors with a solid adsorbent for the removal of impurities. A type X zeolitic molecular sieve is suitable for this purpose. The preparation of this type of molecular sieve is described in U.S. Pat. No. 2,882,244 and elsewhere in the literature. An especially preferred mode of solid adsorptive pretreatment is effected by the utilization of a combination of solid absorbents, which may be disposed in a plurality of separate adsorption zones, wherein at least one of the zones comprises a type 13X molecular sieve. This molecular sieve has an effective pore diameter of 10 to 11 angstrom units, and is preferably used in combination with an auxilary solid adsorbent, such as clay, carbon, alumina, magnesia, silica, silica-alumina and silica-magnesia. A preferred combination is the type 13X zeolitic molecular sieve adsorbent in combination with Attapulgus clay. The latter has the formula

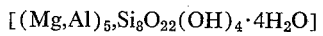

$$[(Mg,Al)_5,Si_8O_{22}(OH)_4 \cdot 4H_2O]$$

and may be suitably provided in adsorption zone that precedes the molecular sieve adsorption zone. Additionally, the adsorption zone that contains the type 13X molecular sieve may additionally contain a small proportion of type 4X molecular sieves. The adsorbents may be suitably employed in a ratio of between about one and about 10 volumes of molecular sieve per volume of auxiliary adsorbent.

This invention may be best understood by reference to the following specific examples, which are illustrative only and are not intended to be limiting as to scope. All of the percentages indicated are by weight, unless otherwise specified.

EXAMPLE 1

A commercial naphtha reforming catalyst containing 0.6 percent platinum on an alumina base, having a chloride content of 0.6 percent and a surface area of about 425 square meters per gram is calcined at a temperature of 550° F. overnight and at 900° F. for two hours. The catalyst is reduced in a stream of hydrogen at 900° F. for a period of two hours. The hydrogen flow rate utilized is 1.5 standard cubic feet per hour per 100 grams of catalyst. The reduced catalyst is purged over a period of six hours in a flow of prepurified nitrogen.

The temperature of the catalyst is then raised to a temperature of 1050° F. in nitrogen and 0.3 mole of hydrogen chloride per 100 grams of catalyst is passed over the catalyst for a period of one hour. The temperature is then reduced to 560° F. with nitrogen and 0.09 mole of sulfur monochloride ($S_2Cl_2$) per 100 grams of catalyst is passed over the catalyst for a period of two and one-half hours.

The temperature is then reduced to 400° F. and 0.9 mole of hydrogen chloride per 100 grams of catalyst is passed over the catalyst for a period of three hours. The catalyst is then cooled.

EXAMPLE 2

Eight-hundred cubic centimeters of the catalyst that is prepared in Example 1 are distributed among three isomerization reactors that are connected in the manner shown in the drawings. The first and second reactors are provided with 25 percent by volume of the catalyst, while the third reactor is provided with 50 percent of the total catalyst. Also, air-cooled heat exchangers are employed between the reactors in the manner illustrated in the drawing.

A normal butane-containing feed is passed through an adsorption tower that contains a bed of adsorbent consisting of Attapulgus clay and a bed of molecular sieves, which are primarily type 13X molecular sieves with a small proportion of type 4X molecular sieves, at a liquid hourly space velocity of about 0.8. The clay comprises 25 percent of the total adsorbent used, while the molecular sieves comprise the remaining 75 percent. This pretreatment reduces the sulfur and water content of the feed to less than one part per million of these impurities.

The purified butane feed is preheated to a temperature of 297° F. and is passed through the first and subsequent reactors at a liquid hourly space velocity of 2.0 along with a gas comprising 95 percent hydrogen and 5 percent methane. A hydrogen partial pressure of 75 p.s.i.g., a butane partial pressure of 365 p.s.i.g. and a total pressure of 445 p.s.i.g. are employed. Additionally, 200 parts per million of chloride are added to the butane feed.

The inter-coolers are regulated so as to maintain the reactor outlet temperature of all three reactors at the identical temperature. The effluent from the first reactor is withdrawn at a reactor outlet temperature of 330° F. The effluent is cooled and then introduced into the second reactor at an inlet temperature of 319° F. This likewise results in an outlet temperature of 330° F. for the second reactor.

The effluent from the second reactor is cooled and is introduced into the third reactor at a temperature of 323° F. As before, an outlet temperature of 330° F. is maintained for the third reactor.

The isobutane product is separated from the third reactor effluent and 62.0 mol percent isobutane is recovered. A gas make of about 1.4 percent by weight based on the total feed results.

EXAMPLE 3

The procedure of Example 2 is repeated, except that the inter-coolers are regulated to achieve descending reactor outlet temperatures with respect to the second and third reactors. Thus, the preheated feed is introduced into the first reactor at a temperature of 297° F. and the effluent therefrom emerges at 330° F. The effluent is cooled to a temperature of 319° F. and the reactor outlet temperature of the second reactor is thereby controlled at 330° F. The effluent from the second reactor is cooled to a temperature of 308° F. and the resulting reactor outlet temperature of the third reactor is 315° F.

The utilization of descending second and third reactor outlet temperatures, respectively, results in an increased yield of 62.5 mol percent isobutane. A gas make of 1.1 percent by weight is obtained.

EXAMPLE 4

The procedure of Example 2 is repeated, except that the coolers are regulated so as to yield descending reactor outlet temperatures for all three reactors. Accordingly, the feed is preheated to a temperature of 308° F. and is introduced into the first reactor, and an outlet temperature of 345° F. results. The effluent from the first reactor is cooled to 324° F. and a lower reactor outlet temperature for the second reactor of 330° F. results. The effluent from the second reactor is cooled to a temperature of 308° F. and a still lower outlet temperature of 315° F. results.

The use of descending reactor outlet temperatures for all three isomerization reaction zones results in a yield of 62.7 mol percent isobutane. A gas make of 1.4 percent by weight results.

EXAMPLE 5

For comparative purposes, the apparatus and procedure of the previous examples are utilized, except that no intercooling of the reactor effluent streams is employed. Thus, the normal butane feedstock is heated to a temperature of 290° F. and is introduced into the first reaction zone whereby a reactor outlet temperature of 345° F. results. The effluent is passed through the second and third reactors as before, and the isobutane product in the third reactor effluent is recovered. A yield of only 60.9 mol percent isobutane results with a gas make of 2.4 percent by weight indicating a lower selectivity to isobutane.

EXAMPLE 6

As a further comparison, the feedstock of the previous examples is pretreated as before and is passed through a single bed of 800 cubic centimeters of the catalyst of Example 1 along with hydrogen as in the previous examples. The same conditions of operation as in Example 5 are employed. Thus, the feed is heated to a temperature of 290° F. and then introduced into the single-bed reactor. The effluent emerges at a temperature of 345° F. and the yield of isobutane and gas make is identical to that obtained in Example 5.

The results of the foregoing examples indicate that from 1.1 to 1.8 mol percent more isomer is obtainable by employing the inter-cooled, multi-bed system of the present invention, as compared with either the uncooled multibed or single-bed isomerization reactor systems. Furthermore, even more isomer is obtainable by employing descending reactor outlet temperatures. As illustrated in Example 4, an additional 0.7 mol percent more isomer was obtainable when descending outlet temperatures were employed as compared to Example 2 where the outlet temperatures were maintained at the same value.

Many details have been omitted from the drawing and the written description of the invention in the interests of simplicity and clarity, as for example, compressors, pumps, valves, automatic control devices, etc., all of which are well known in the art.

Obviously, many modifications and variations of the invention as hereinabove set forth can be made without departing from the spirit and scope thereof and, therefore, only such limitations should be imposed as are indicated in the appended claims.

We claim:

1. A process for the isomerization of an isomerizable hydrocarbon, which process comprises contacting a reaction mixture of hydrogen and said hydrocarbon with an isomerization catalyst consisting essentially of a metalliferous hydrogenation component selected from the group consisting of Group VI and Group VIII metals supported on an alumina carrier, wherein the activity of said catalyst has been enhanced by the pretreatment with hydrogen chloride and subsequent activation with a compound consisting essentially of thionyl chloride or sulfur monochloride in a plurality of substantially adiabatic reaction zones, the reaction mixture being introduced into the first of the reaction zones at a temperature in the range between about 250° and about 450° F., and reducing the temperature of the effluent from each of said zones prior to the entry of said effluent into a subsequent reaction zone so as to control the rise in temperature across each subsequent reaction zone to provide an outlet temperature from each subsequent reaction zone which is between about 25° F. above and about 50° F. below the outlet temperature of the first reaction zone the residence time in the first reaction zone being equal to or lesser than the residence time in subsequent reaction zones.

2. The process of claim 1 wherein the isomerizable hydrocarbon is selected from the group consisting of n-butane, n-pentane, hexanes, methylcyclopentane, and cyclohexane.

3. The process of claim 2 wherein the isomerizable hydrocarbon is normal butane.

4. The process of claim 1 wherein outlet temperature of the first reaction zone is above that of the next subsequent reaction zone.

5. The process of claim 4 wherein the outlet temperature of each of the reaction zones is maintained in a descending order of temperature in the direction of flow.

6. The process of claim 1 wherein the outlet temperature is substantially the same for each of the reaction zones.

7. The process of claim 4 wherein the outlet temperature of the reaction zones subsequent to the first reaction zone is maintained at a temperature of between about 10° and about 30° F. below the outlet temperature of the first reaction zone.

8. The process of claim 7 wherein the isomerizable hydrocarbon is normal butane.

9. The process of claim 1 wherein the isomerizable hydrocarbon is subjected to an adsorptive pretreatment with a combination of solid absorbents prior to being introduced into the first reaction zone.

10. The process of claim 1 wherein the residence time in each reaction zone is no greater than the residence time in the immediately subsequent reaction zone.

References Cited
UNITED STATES PATENTS

| | | | |
|---|---|---|---|
| 2,349,516 | 5/1944 | Pines et al. | 260—683.67 |
| 2,401,242 | 5/1946 | Hachmuth et al. | 260—683.67 |
| 2,972,650 | 2/1961 | Burk et al. | 260—683.67 |
| 3,063,934 | 11/1962 | Epperly et al. | 260—683.65 |
| 2,393,041 | 1/1946 | Greenfelder | 260—683.65 |
| 2,831,908 | 4/1958 | Starnes et al. | 260—683.65 |

DELBERT E. GANTZ, Primary Examiner

G. J. CRASANAKIS, Assistant Examiner

U.S. Cl. X.R.

260—683.68

PO-1050
(5/69)

UNITED STATES PATENT OFFICE
CERTIFICATE OF CORRECTION

Patent No. 3,541,181          Dated November 17, 1970

Inventor(s) Paul G. Bercik and Alfred M. Henke

It is certified that error appears in the above-identified patent and that said Letters Patent are hereby corrected as shown below:

Column 2, line 27, "th" should be --the--.

Column 3, line 35, "Mendeleev's" should be --Mendelyeev's--

Column 5, line 74, "absorbents" should be --adsorbents--.

Column 6, line 4, "auxilary" should be --auxiliary--.

SIGNED AND
SEALED
FEB 2 1971

(SEAL)
Attest:

Edward M. Fletcher, Jr.
Attesting Officer

WILLIAM E. SCHUYLER, JR
Commissioner of Patents